US012770431B2

(12) United States Patent
Kashiyama et al.

(10) Patent No.: US 12,770,431 B2
(45) Date of Patent: Oct. 20, 2026

(54) INFORMATION PROCESSING APPARATUS AND CONTROL METHOD

(71) Applicant: Lenovo (Singapore) Pte. Ltd., Singapore (SG)

(72) Inventors: Hideki Kashiyama, Kanagawa (JP); Yuji Wada, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 378 days.

(21) Appl. No.: 18/494,107

(22) Filed: Oct. 25, 2023

(65) Prior Publication Data

US 2024/0193989 A1 Jun. 13, 2024

(30) Foreign Application Priority Data

Dec. 12, 2022 (JP) ................................ 2022-197918

(51) Int. Cl.
*G06V 40/16* (2022.01)
*G06V 10/24* (2022.01)

(52) U.S. Cl.
CPC ............ *G06V 40/172* (2022.01); *G06V 10/24* (2022.01)

(58) Field of Classification Search
CPC .... G06V 40/172; G06V 10/24; G06V 10/147; G06V 20/60; H04N 23/611; H04N 25/11; H04N 25/134; H04N 25/533; H04N 23/60; H04N 23/61; H04N 23/741
See application file for complete search history.

(56) References Cited

U.S. PATENT DOCUMENTS

| | | | | |
|---|---|---|---|---|
| 11,163,977 B2 * | 11/2021 | Yamada | ............... | G06V 10/141 |
| 12,086,628 B2 * | 9/2024 | Kosugi | .................. | G06V 40/18 |
| 12,401,911 B2 * | 8/2025 | Rivard | ................... | H04N 23/76 |

(Continued)

FOREIGN PATENT DOCUMENTS

| | | |
|---|---|---|
| CN | 110705336 A | 1/2020 |
| JP | 2014-175734 A | 9/2014 |

(Continued)

OTHER PUBLICATIONS

Vladimir Koifman et al. "Image Sensors World News and discussions about image sensors" online <URL:http://image-sensors-world.blogspot.com/2013/01/sony-explains-hdr-video-mode-in-its.html>, searched on Oct. 19, 2022 (2 pages).

*Primary Examiner* — Wesley J Tucker
(74) *Attorney, Agent, or Firm* — Osha Bergman Watanabe & Burton LLP

(57) ABSTRACT

An information processing apparatus includes: an imaging unit which outputs data of an image captured using multiple pixels arranged on an image sensor; a memory which temporarily stores the outputted data of the image; and a first processor and a second processor processing the stored data of the image. The first processor controls the multiple pixels to capture images under imaging conditions different for each of preset plural kinds of pixel groups in order to execute first processing using data of the images captured from each of the plural kinds of pixel groups. The second processor executes second processing using data of an image captured by one kind of pixel group among data of the images captured from each of the plural kinds of pixel groups under the control of the first processor.

6 Claims, 7 Drawing Sheets

HDR IMAGE CREATION

(56) References Cited

U.S. PATENT DOCUMENTS

| | | | | |
|---|---|---|---|---|
| 2012/0113297 | A1* | 5/2012 | Mori | H04N 25/589 348/E9.053 |
| 2012/0307102 | A1* | 12/2012 | Yuyama | H04N 23/611 348/222.1 |
| 2015/0244916 | A1* | 8/2015 | Kang | H04N 23/741 348/222.1 |
| 2017/0324909 | A1* | 11/2017 | Choi | H04N 23/741 |
| 2021/0243352 | A1* | 8/2021 | Mcelvain | H04N 25/134 |
| 2021/0360139 | A1* | 11/2021 | Mcelvain | H04N 25/583 |
| 2022/0053118 | A1* | 2/2022 | Nashizawa | H04N 23/741 |
| 2023/0421913 | A1* | 12/2023 | Nagata | H04N 25/583 |
| 2025/0016297 | A1* | 1/2025 | Presler | H04N 23/633 |
| 2025/0272792 | A1* | 8/2025 | Chou | G06T 5/50 |

FOREIGN PATENT DOCUMENTS

| | | | |
|---|---|---|---|
| JP | 2015012567 | A | 1/2015 |
| JP | 2015-092660 | A | 5/2015 |
| JP | 2018-056944 | A | 4/2018 |
| JP | 2019-185349 | A | 10/2019 |
| JP | 2020-198470 | A | 12/2020 |

* cited by examiner

LOW ILLUMINANCE

STANDARD ILLUMINANCE

HDR IMAGE CREATION

N FLAME (ODD LINES)

N+1 FLAME (EVEN LINES)

N+2 FLAME (ODD LINES)

N+3 FLAME (EVEN LINES)
Short exposure
Long exposure
CAPTURED IMAGE
DETECTION IMAGE

INFORMATION PROCESSING APPARATUS AND CONTROL METHOD

CROSS-REFERENCE TO RELATED APPLICATIONS

This application claims priority to Japanese Patent Application No. 2022-197918 filed on Dec. 12, 2022, the contents of which are hereby incorporated herein by reference in their entirety.

BACKGROUND OF THE INVENTION

Field of the Invention

The present invention relates to an information processing apparatus and a control method.

Description of the Related Art

An image sensor included in a camera (imaging unit) captures an image with proper brightness by controlling the exposure time. It is common to set the exposure time longer in a dark area and shorter in a bright area. In recent years, there has been a camera that can change the exposure (exposure time) every line of pixels arranged on the image sensor to synthesize images with different exposures in order to create an HDR (High Dynamic Range) image (for example, see Vladimir Koifman/Atul Ingle, "Image Sensors World News and discussions about image sensors", [online], [searched on Oct. 19, 2022], on the internet <URL: http://image-sensors-world.blogspot.com/2013/01/sony-explains-hdr-video-mode-in-its.html>).

Further, technology (so-called CV (Computer Vision)) to detect and use information in captured images by performing image processing on the images captured by a camera (imaging unit) is becoming common (for example, see Japanese Unexamined Patent Application Publication No. 2019-185349).

For example, there is an information processing apparatus that performs HPD (Human Presence Detection) processing to detect the presence of a person from an image captured by a camera using face detection technology or face recognition technology.

For example, in an information processing apparatus such as a PC (Personal Computer), the above-described HPD processing is performed regardless of whether or not a system is using a camera function. When the system is using the camera function, an image captured with camera settings controlled by the system is used in the HPD processing. For example, when an HDR image is created using the camera function by the system, since the HDR image is controlled by exposures (exposure times) different every line of pixels arranged on an image sensor of the camera (imaging unit), captured images used in HPD processing are also images different in exposure (exposure time) line by line. In this case, if the HDR image is created from images different in exposure (exposure time) line by line even on the HPD processing side to detect the presence of a person, it will be unfavorable because the impact on the processing load costs increases.

SUMMARY OF THE INVENTION

The present invention provides an information processing apparatus and a control method capable of performing HPD processing using a captured image properly regardless of the usage state of a camera function while reducing the impact on the processing load and costs.

An information processing apparatus according to the first aspect of the present invention includes: an imaging unit which outputs data of a captured image captured using multiple pixels arranged on an image sensor; a memory which temporarily stores the data of the captured image output from the imaging unit; and a first processor and a second processor which execute processing using the data of the captured image stored in the memory, wherein the first processor controls the imaging unit to control the multiple pixels arranged on the image sensor to capture images under imaging conditions different for each of preset plural kinds of pixel groups in order to execute first processing using data of the captured images each of which is captured from each of the plural kinds of pixel groups, and the second processor executes second processing using data of a captured image of one kind of pixel group among data of the captured images each of which is captured from each of the plural kinds of pixel groups captured by the imaging unit under the control of the first processor.

The above information processing apparatus may be such that the second processor executes, as the second processing, processing to detect presence of a person from a captured image using the data of the captured image of one kind of pixel group among the data of the captured images each of which is captured from each of the plural kinds of pixel groups.

The above information processing apparatus may also be such that when repeatedly executing the second processing, the second processor switches the kind of pixel group of the data of the captured image used in the second processing among the data of the captured images each of which is captured from each of the plural kinds of pixel groups.

The above information processing apparatus may further be such that wherein when detecting the presence of a person in the second processing, the second processor uses data of a captured image of the same kind of pixel group as the data of the captured image from which the presence of the person is detected next time when executing the second processing.

Further, the above information processing apparatus may be such that when not detecting the presence of a person in the second processing, the second processor switches to data of a captured image of a kind of pixel group different from the data of the captured image of the pixel group from which the presence of a person is not detected next time when executing the second processing.

Further, the above information processing apparatus may be such that the first processor controls the imaging unit to control the multiple pixels to capture images at exposure times different for each of the plural kinds of pixel groups.

Further, the above information processing apparatus may be such that, as the first processing, the first processor synthesizes the data of the captured images captured at the exposure times different for each of the plural kinds of pixel groups to generate data of an image with extended dynamic range.

Further, the above information processing apparatus may be such that the multiple pixels are arranged in a matrix on the image sensor, and the plural kinds of pixel groups are pixel groups in units of one or more rows among the multiple pixels arranged on the image sensor.

A control method according to the second aspect of the present invention is a control method for an information processing apparatus including: an imaging unit which outputs data of a captured image captured using multiple pixels arranged on an image sensor; a memory which temporarily stores the data of the captured image output from the imaging unit; and a first processor and a second processor which execute processing using the data of the captured image stored in the memory, the control method including: a step of causing the first processor to control the imaging unit to control the multiple pixels arranged on the image sensor to capture images under imaging conditions different for each of preset plural kinds of pixel groups; a step of causing the first processor to execute first processing using data of the captured images each of which is captured from each of the plural kinds of pixel groups; and a step of causing the second processor to execute second processing using data of a captured image of one kind of pixel group among data of the captured images each of which is captured from each of the plural kinds of pixel groups captured by the imaging unit under the control of the first processor.

The above-described aspects of the present invention can perform HPD processing using a captured image properly regardless of the usage state of a camera function while reducing the impact on the processing load and costs.

DETAILED DESCRIPTION OF THE INVENTION

Embodiments of the present invention will be described below with reference to the accompanying drawings.

First Embodiment

First, a first embodiment of the present invention will be described.

An information processing apparatus 1 according to the present embodiment is, for example, a laptop PC (Personal Computer). Note that the information processing apparatus 1 may also be any other form of information processing apparatus such as a desktop PC, a tablet terminal, or a smartphone.

Figure 1:
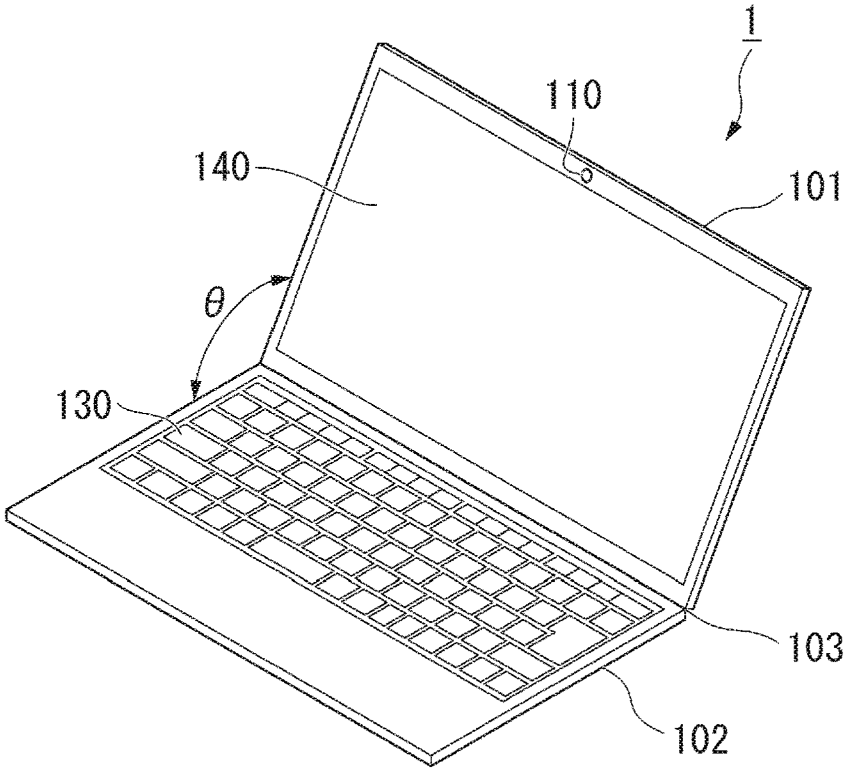
FIG. 1 is a perspective view illustrating the appearance of an information processing apparatus according to a first embodiment.

FIG. 1 is a perspective view illustrating the appearance of the information processing apparatus according to the present embodiment. The information processing apparatus 1 illustrated is a clamshell type laptop PC (Personal Computer). The information processing apparatus 1 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the rotation axis of the hinge mechanism 103.

A state where an open angle θ (hinge angle) between the first chassis 101 and the second chassis 102 around the rotation axis is substantially 0° is a state where the first chassis 101 and the second chassis 102 are closed to overlap each other (called "closed state"). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. A state opposite to the closed state, where the first chassis 101 and the second chassis 102 are open, is called an "open state." The open state is a state where the first chassis 101 and the second chassis 102 are rotated relative to each other until the open angle θ exceeds a preset threshold value (for example, 10°). Note that in typical usage states of the information processing apparatus 1, the open angle θ is often about 90° to 140°.

A display unit 140 is provided on the inner surface of the first chassis 101. The display unit 140 displays images based on processing executed in the information processing apparatus 1. Further, a keyboard 130 is provided on the inner surface of the second chassis 102. The keyboard 130 is provided as an input device to accept user operations. In the closed state, the display unit 140 is made invisible and operations on the keyboard 130 are disabled. On the other hand, in the open state, the display unit 140 is made visible and operations on the keyboard 130 are enabled (that is, the information processing apparatus 1 is usable).

Further, a camera 110 is provided in a peripheral area of the display unit 140 on the inner surface of the first chassis 101. The camera 110 is provided in a position capable of imaging a direction to face the inner surface of the first chassis 101 (the display screen of the display unit 140). In other words, the camera 110 is provided in a position capable of imaging a user who uses the information processing apparatus 1. For example, the information processing apparatus 1 detects a person from an image captured by the camera 110 to detect the presence or absence of the user who uses the information processing apparatus 1.

Figure 2:
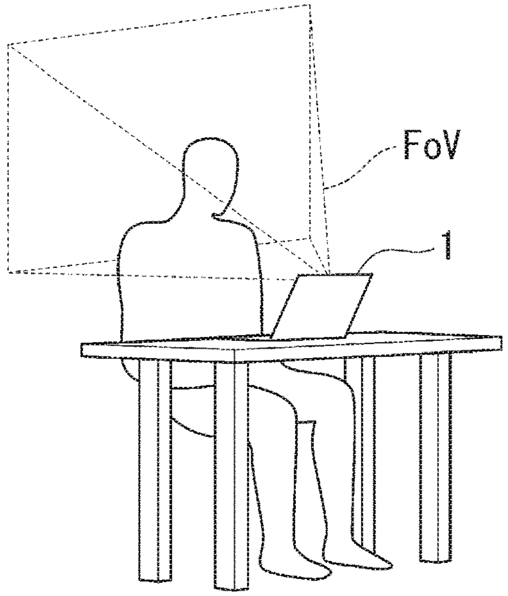
FIG. 2 is a diagram illustrating an example of a person detection range of the information processing apparatus according to the first embodiment.

FIG. 2 is a diagram illustrating an example of a person detection range of the information processing apparatus 1 according to the present embodiment. In the illustrated example, a detection range FoV (Field of View: detection viewing angle) in a direction to face the inner surface of the first chassis 101 is a person-detectable range. The detection range FoV corresponds to an imaging angle of view of the camera 110. In the following, the direction to face the inner surface of the first chassis 101 in the open state is called the front of the information processing apparatus 1. The information processing apparatus 1 detects an image area with a person or a face of the person captured therein from a captured image captured by the camera 110 to detect whether or not the person is present in front of the information processing apparatus 1. Here, processing for detecting the presence of a person is called HPD (Human Presence Detection) processing.

Further, the information processing apparatus 1 controls the operating state of a system based on the detection result of the presence of the person by the HPD processing. As operating states of the system, there are at least a normal operating state (power-on state) and a standby state. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state may be the standby state or a sleep state, modern standby in Windows (registered trademark), or a state corresponding to S3 state (sleep state) defined in the ACPI specification. Further, a state in which at least the display of the display unit appears to be OFF (screen OFF), or a screen lock state may be included as the standby state. The screen lock is a state in which an image preset to make a content being processed invisible (for example, an image for the screen lock) is displayed on the display unit, that is, an unusable state until the lock is released (for example, until the user is authenticated).

Figure 3A:
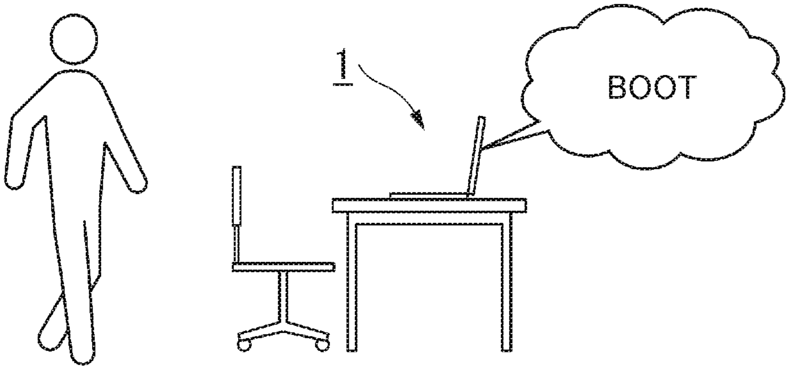
FIGS. 3A-3C are diagrams for describing an outline of HPD processing of the information processing apparatus according to the first embodiment.
Figure 3B:
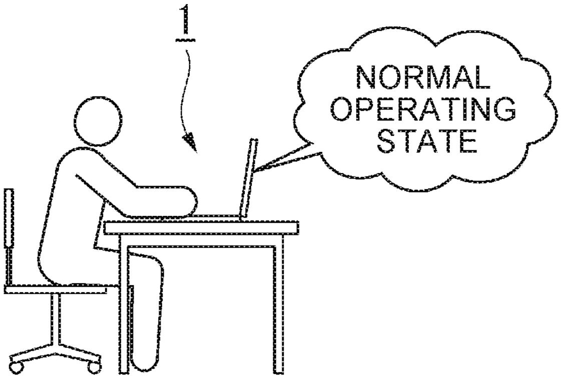
Figure 3C:
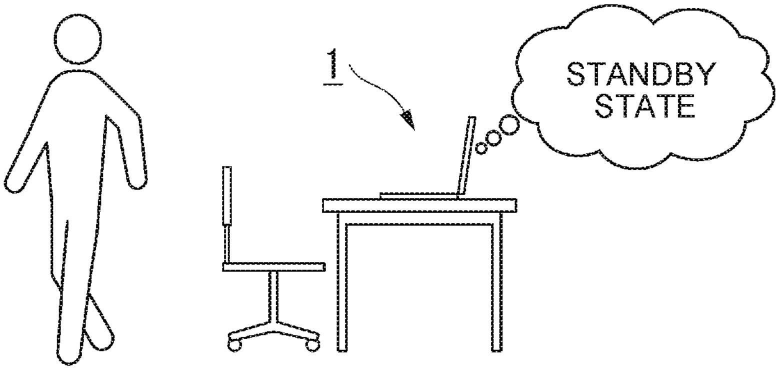

FIGS. 3A-3C are diagrams for describing the outline of HPD processing of the information processing apparatus 1 according to the present embodiment. The information processing apparatus 1 detects the presence or absence of a person by the HPD processing to control the operating state of the system of the information processing apparatus 1 based on the detection result. For example, as illustrated in FIG. 3A, when detecting a change from a state where no person is present in front of the information processing apparatus 1 (Absence) to a state where a person is present (Presence) in the standby state, that is, when detecting that a person has approached the information processing apparatus 1 (Approach), the information processing apparatus 1 automatically boots the system to make a transition to the normal operating state. Further, when detecting a state where a person is present in front of the information processing apparatus 1 (Presence) in the normal operating state as illustrated in FIG. 3B, the information processing apparatus 1 continues the normal operating state. Then, as illustrated in FIG. 3C, when detecting a change from the state where the person is present in front of the information processing apparatus 1 (Presence) to a state where no person is present (Absence) in the normal operating state, that is, when detecting that the person has left the information processing apparatus 1 (Leave), the information processing apparatus 1 automatically causes the system to make a transition to the standby state.

The camera 110 is not only used in the HPD processing described above, but also used to obtain a captured image (shot image) such as a still image or video as a camera function of the system. An image sensor provided in the camera 110 can control the exposure time (for example, electronic shutter control) to capture an image with proper brightness. It is common that the image sensor controls the exposure time to a long exposure time in a dark scene and a short exposure time in a bright scene. Further, the image sensor provided in the camera 110 can create an HDR (High Dynamic Range) image by dividing multiple pixels arranged on the image sensor into two kinds of pixel groups, capturing images of respective pixel groups at two different exposure times, and synthesizing the images.

Figure 4A:
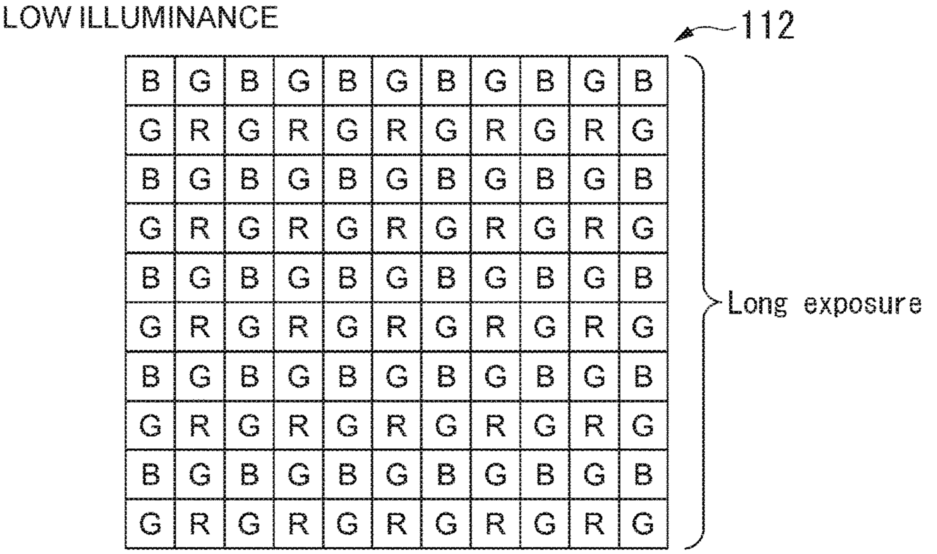
FIGS. 4A-4C are schematic diagrams for describing exposure time control on an image sensor according to the first embodiment.
Figure 4B:
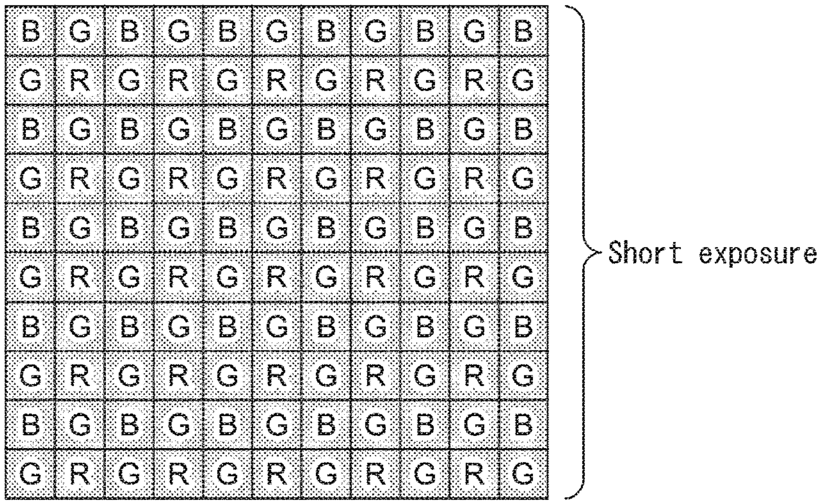
Figure 4C:
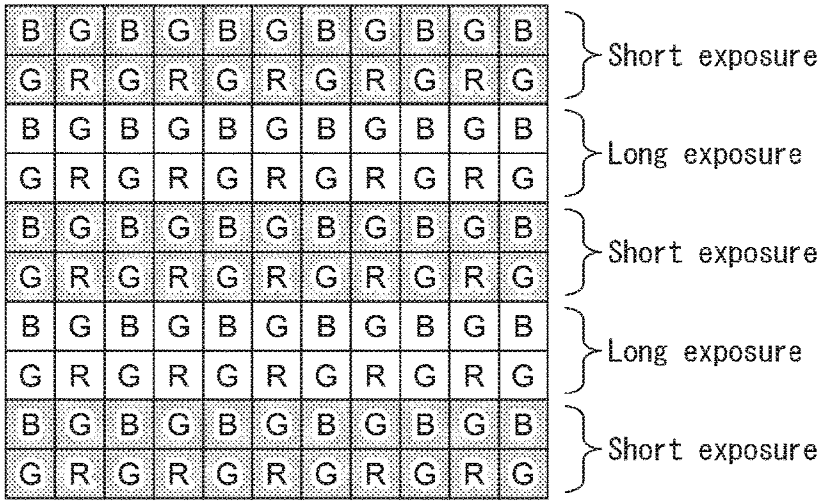
Figures 5A, 5B, 5C, 5D:
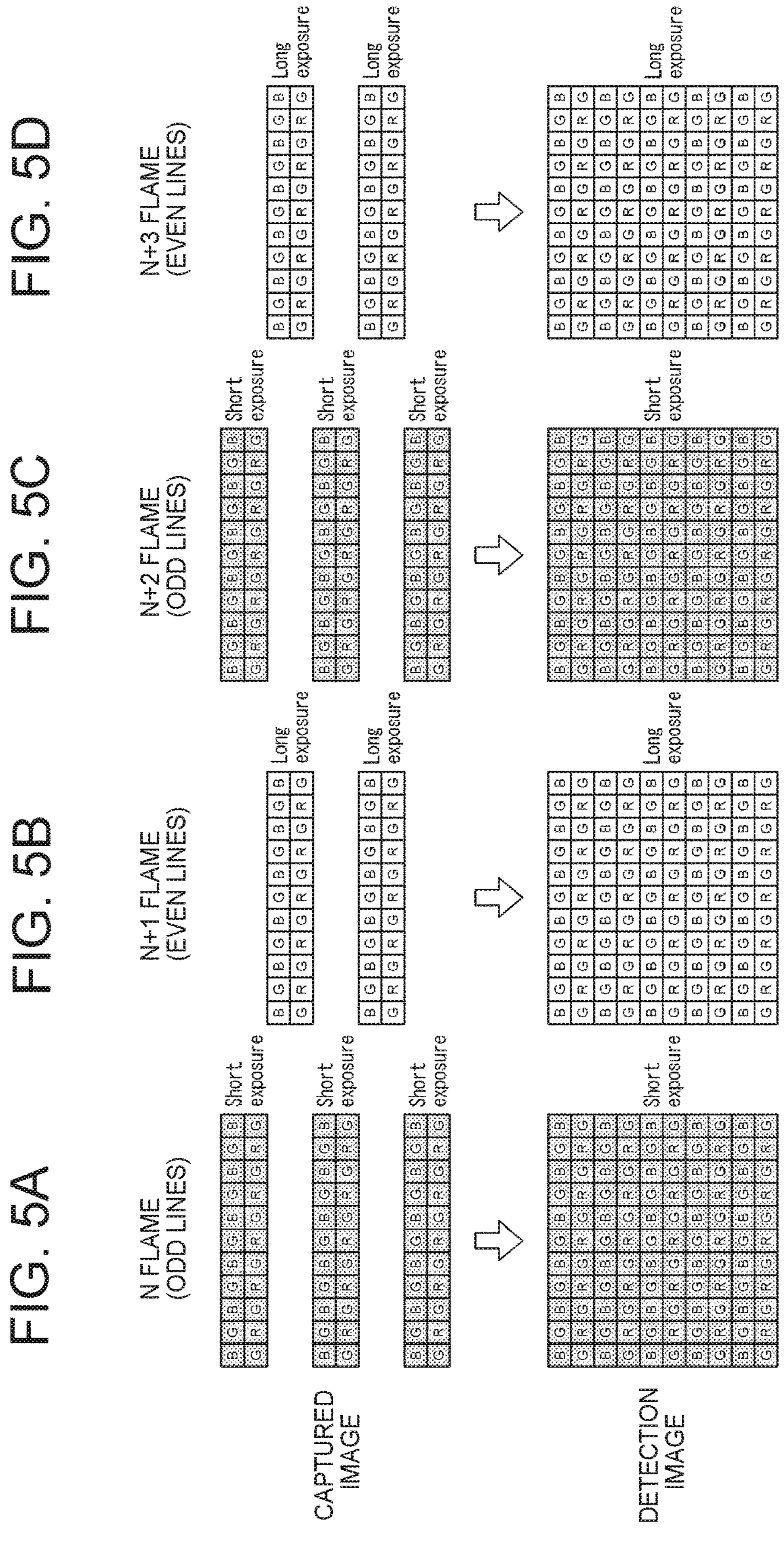
FIGS. 5A-5D are schematic diagrams for describing a method of generating a detection image in HPD processing according to the first embodiment.

FIGS. 4A-4C are schematic diagrams for describing exposure time control on the image sensor according to the present embodiment. FIGS. 4A-4C illustrate part of multiple pixels arranged on an image sensor 112. On the image sensor 112, R pixels with color filters that allow light in an R (red) wavelength band to pass through, G pixels with color filters that allow light in a G (green) wavelength band to pass through, and B pixels with color filters that allow light in a B (blue) wavelength band to pass through are arranged in a matrix. The image sensor 112 outputs an RGB image (visible light image) signal obtained by photoelectrically converting visible light incident through the RGB color filters.

For example, the image sensor 112 is a Bayer array image sensor on which an RG column of R and G pixels and a GB column of G and B pixels are alternately repeated. Combinations of adjacent RG columns and GB columns construct one line of a pixel group on a line-by-line basis. During normal shooting without creating any HDR image, multiple pixels arranged on the image sensor 112 are controlled by the same exposure time. FIG. 4A illustrates normal shooting under low-illuminance conditions (dark scene), where the pixels are controlled by a long exposure time. FIG. 4B illustrates normal shooting under standard-illuminance conditions (scene with normal brightness), where the pixels are controlled by an exposure time shorter than that of FIG. 4A.

On the other hand, when creating an HDR image, the pixels are controlled by two kinds of exposure times different line by line (on a line-by-line basis) as illustrated in FIG. 4C. For example, odd lines are controlled by the short exposure time to adjust the exposure by giving priority to bright parts. Even lines are controlled by the long exposure time to adjust the exposure by giving priority to dark parts. The HDR image can be created by synthesizing an image captured on the odd lines at the short exposure time and an image captured on the even lines at the long exposure time.

Here, when performing the HPD processing regardless of whether or not the system is using the camera 110 as the camera function, the camera 110 described above may be controlled by the two kinds of exposure times different line by line to create an HDR image. From images different line by line in exposure time, a person cannot be detected in the HPD processing. If the images different line by line in exposure time are synthesized into an HDR image even in the HPD processing, it will have a greater impact on the processing load and costs. Therefore, in the HPD processing according to the present embodiment, only either one of the image captured on the odd lines and the image captured on the even lines is used to generate an image for person detection.

FIGS. 5A-5D are schematic diagrams for describing a method of generating a detection image in the HPD processing according to the present embodiment. For example, in the HPD processing, only either one of the image captured on the odd lines and the image captured on the even lines is used to generate a detection image for every frame, and the odd lines and the even lines are alternately switched for every frame. In the illustrated example, only the image captured on the odd lines is used for N frame (where N is a positive integer) to generate a detection image, only the image captured on the even lines is used for N+1 frame to generate a detection image, only the image captured on the odd lines is used for N+2 frame to generate a detection image, and only the image captured on the even lines is used for N+3 frame to generate a detection image. After that, the odd lines and the even lines are alternately switched for every frame.

Thus, since the image controlled to be captured at the same exposure time becomes the detection image, a person is detectable. Further, since the odd lines and the even lines are different in exposure time, the odd lines with the short exposure time are more suitable for person detection than the even lines in the bright scene, and the even lines with the long exposure time are more suitable for person detection than the odd lines in the dark scene. When a person is present in front of the information processing apparatus 1, the person can be detected in either or both of the detection image on the odd lines and the detection image on the even lines depending on the brightness of the scene.

Note that since the detection image is an image thinned out line by line using only either one of the odd lines and the even lines, the resolution is lowered compared to that of an image using both lines (all lines). However, for person detection, since the image has only to detect a person, a face outline, face eyes, or the like, the person can be detected without any difficulty from a commonly used number of pixels on the image sensor.

For example, the information processing apparatus 1 performs HPD processing using only either one of the image captured on the odd lines and the image captured on the even lines regardless of whether or not the system is using the camera 110 as the camera function. Thus, the information processing apparatus 1 can perform the HPD processing using the captured image properly without being aware of whether or not the system is using the camera function or an HDR function and without impact on the processing load and costs to create an HDR image.

Further, when repeatedly executing the HPD processing, the information processing apparatus 1 alternately switches between the odd lines and the even lines each time the HPD processing is executed (for example, for every frame). Therefore, even when a person cannot be detected due to the fact that the exposure of either one of the odd lines and the even lines cannot be performed properly, the person can be detected by the exposure of the other of the odd lines and the even lines.

Next, the configuration of the information processing apparatus 1 according to the present embodiment will be described in detail.

[Configuration of Information Processing Apparatus]

Figure 6:
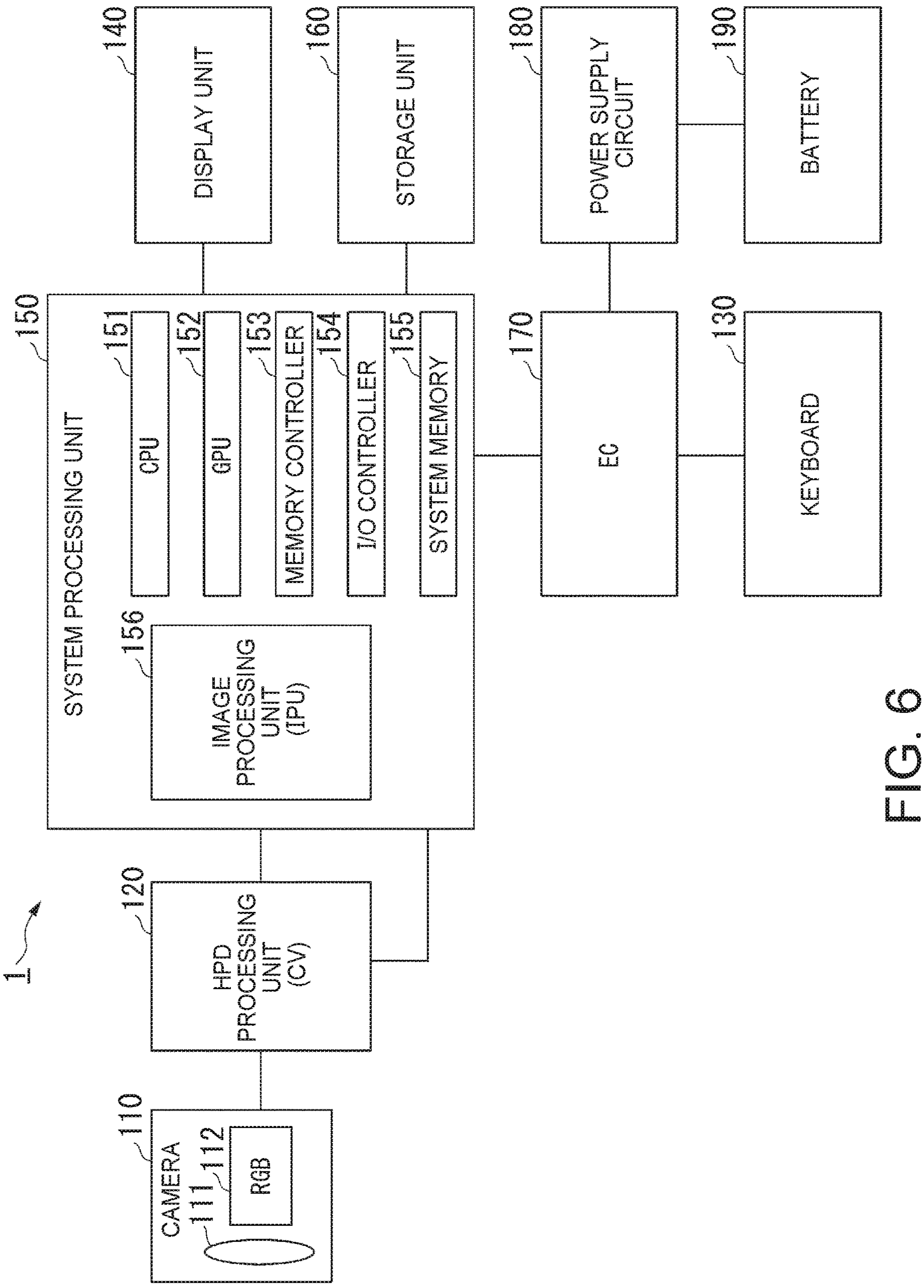
FIG. 6 is a block diagram illustrating an example of the configuration of the information processing apparatus according to the first embodiment.

FIG. 6 is a block diagram illustrating an example of the configuration of the information processing apparatus 1 according to the present embodiment. In FIG. 6, components corresponding to respective units in FIG. 1 and FIG. 2 are given the same reference numerals. The information processing apparatus 1 includes the camera 110, an HPD processing unit 120, the keyboard 130, the display unit 140, a system processing unit 150, a storage unit 160, an EC 170, a power supply circuit 180, and a battery 190.

The camera 110 includes a lens 111 and the image sensor 112. Light from a shooting subject is focused by the lens 111 and incident on the image sensor 112. For example, the image sensor 112 is an image sensor on which R pixels, G pixels, and B pixels are arranged as described with reference to FIGS. 4A-4C and FIGS. 5A-5D. The camera 110 outputs data of a captured image (RGB image) captured based on the light incident from the shooting subject onto the image sensor 112 through the lens 111.

The HPD processing unit 120 is an example of a processor for executing so-called CV (Computer Vision) processing using information in a captured image detected by performing image processing on the captured image captured by the camera 110. For example, the HPD processing unit 120 executes HPD processing for detecting the presence of a person using data of the captured image captured by the camera 110, and transmits the detection result to the system processing unit 150.

Specifically, the HPD processing unit 120 executes HPD processing using data of a captured image of one kind of pixel group among data of captured images of plural kinds of pixel groups captured by the camera 110. As an example, the plural kinds of pixel groups are pixel groups for every one or more lines (on a line-by-line basis) among the multiple pixels arranged on the image sensor 112. For example, as described with reference to FIGS. 5A-5D, the HPD processing unit 120 generates a detection image for person detection using only either one of the image captured by the pixel group of odd lines and the image captured by the pixel group of even lines. Then, the HPD processing unit 120 detects an image area with a person or a face of the person captured therein from the generated detection image to execute the HPD processing. Further, the HPD processing unit 120 generates a detection image by alternatingly switching between the odd lines and the even lines for every frame to execute the HPD processing using the generated detection image.

The keyboard 130 is an input device with multiple keys (operating elements) arranged thereon to accept user operations. As illustrated in FIG. 1, the keyboard 130 is provided on the inner surface of the second chassis 102. The keyboard 130 outputs, to the EC 170, input information (for example, operation signals indicative of operated keys) input by the user operations.

The display unit 140 is configured, for example, to include a liquid crystal display or an organic EL (Electro Luminescence) display, which displays a display image based on processing executed by the system processing unit 150.

The system processing unit 150 includes a CPU (Central Processing Unit) 151, a GPU (Graphic Processing Unit) 152, a memory controller 153, an I/O (Input-Output) controller 154, a system memory 155, and an image processing unit 156.

The CPU 151 executes processing by the system such as a BIOS and an OS and processing by application programs running on the OS. For example, the CPU 151 controls the operating state of the system based on the detection result of the presence of a person by the HPD processing unit 120.

The GPU 152 generates data of a display image to be displayed on the display unit 140 under the control of the CPU 151, and outputs the generated display image data to the display unit 140.

The memory controller 153 controls reading and writing of data from the system memory 155 or the storage unit 160 under the control of the CPU 151 and the GPU 152.

The I/O controller 154 controls input/output of data from the display unit 140 and the EC 170.

The system memory 155 is used as a reading area of a program executed by the processor and a working area to write processed data. Further, the system memory 155 temporarily stores data of a captured image captured by the camera 110, data as a result of performing image processing on the captured image, and the like.

The image processing unit 156 is an example of an IPU (Image Processing Unit) for controlling the camera 110 to acquire data of a captured image captured under predetermined imaging conditions in order to execute image processing on the acquired data of the captured image. For example, during normal shooting, the image processing unit 156 controls the multiple pixels arranged on the image sensor 112 to capture an image under the same imaging conditions (for example, at the same exposure time) in order to perform image processing for generating one shot image using data of the captured image.

On the other hand, when creating an HDR image (during HDR shooting), the image processing unit 156 controls the multiple pixels to capture images under imaging conditions different for each of preset plural kinds of pixel groups in order to perform image processing for creating one HDR image (HDR shot image) using data of the captured images each of which is captured from each of the plural kinds of pixel groups. For example, the multiple pixels arranged on the image sensor 112 are controlled to capture images at exposure times different between the odd lines and the even lines in order to create an HDR image by synthesizing data of a captured image on the odd lines and data of a captured image on the even lines.

The storage unit 160 is configured to include storage media, such as an HDD (Hard Disk Drive) or an SDD (Solid State Drive), a secure NVRAM (Non-Volatile RAM), and a ROM (Read Only Memory). For example, the HDD or the SSD stores the OS, device drivers, various programs such as applications, and various data. For example, data of a shot image (or an HDR shot image) generated by the image processing unit 156 performing image processing on a captured image(s) captured by the camera 110 is stored in a predetermined file format (such as JPEG).

The EC 170 is a one-chip microcomputer for monitoring various devices (peripheral devices, sensors, and the like) to control the various devices. The EC 170 includes a CPU, a ROM, a RAM, multi-channel A/D input terminal and D/A output terminal, a timer, and digital input/output terminals, which are not illustrated. For example, the keyboard 130, the power supply circuit 180, and the like are connected to the digital input/output terminals of the EC 170. The EC 170 receives input information (operation signals) from the keyboard 130. Further, the EC 170 controls the operation of the power supply circuit 180 and the like.

The power supply circuit 180 is configured to include, for example, a DC/DC converter, a charge/discharge unit, and the like. For example, the power supply circuit 180 converts DC voltage, supplied from an external power supply such as an AC adapter (not illustrated) or the battery 190, to plural voltages required for operating the information processing apparatus 1 to supply power to each unit of the information processing apparatus 1 under the control of the EC 170.

The battery 190 is, for example, a lithium battery, which is charged through the power supply circuit 180 when being powered from an external power supply or discharges the power charged through the power supply circuit 180 as power for operating each unit of the information processing apparatus 1 when not being powered from the external power supply.

[Operation of HPD Processing]

Figure 7:
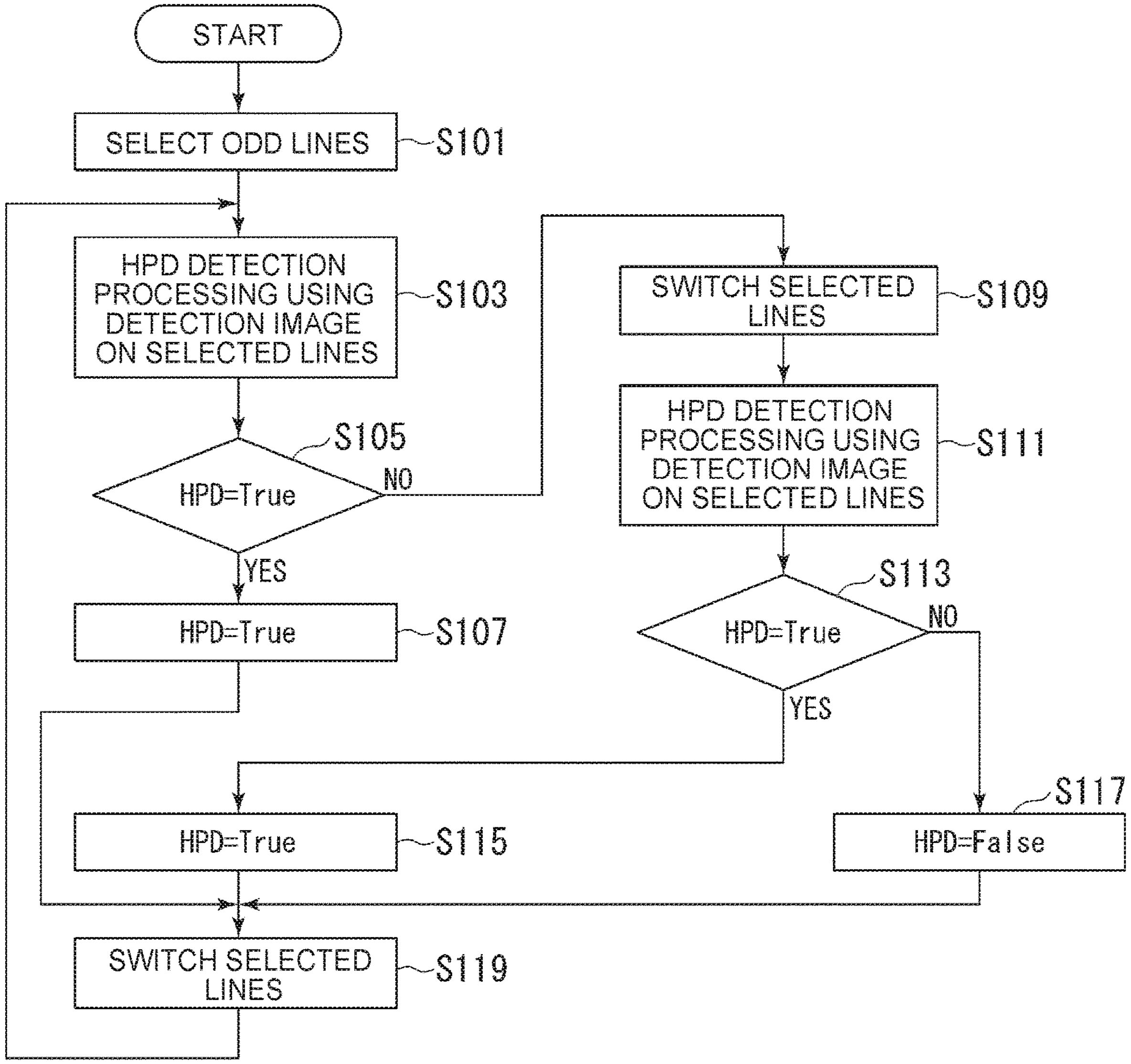
FIG. 7 is a flowchart illustrating HPD processing according to the first embodiment.

Referring next to FIG. 7, the operation of HPD processing executed by the HPD processing unit 120 will be described. FIG. 7 is a flowchart illustrating an example of the HPD processing according to the present embodiment.

(step S101) The HPD processing unit 120 selects odd lines as a detection image, and proceeds to a process in step S103.

(Step S103) The HPD processing unit 120 generates a detection image from an image captured by a pixel group of selected lines (odd lines) to execute HPD processing using the generated detection image. Then, the HPD processing unit 120 proceeds to a process in step S105.

(Step S105) Based on the detection result by the HPD processing in step S103, the HPD processing unit 120 determines whether or not the presence of a person is detected (HPD=True) from the detection image on the odd lines. When determining that the presence of a person is detected from the detection image on the odd lines (YES), the HPD processing unit 120 proceeds to a process in step S107. On the other hand, when determining that the presence of a person is not detected from the detection image on the odd lines (NO), the HPD processing unit 120 proceeds to a process in step S109.

(Step S107) When determining in step S105 that the presence of a person is detected from the detection image on the odd lines, the HPD processing unit 120 determines that a person (user) is present in front of the information processing apparatus 1 as a result of adopting the detection result (HPD=True). Then, the HPD processing unit 120 proceeds to a process in step S119. In step S119, the HPD processing unit 120 switches the selected lines for a detection image in the next frame (for example, switches from the odd lines to the even lines). Then, the HPD processing unit 120 returns to the process in step S103 in which the HPD processing unit 120 generates a detection image from an image captured by the pixel group of even lines in the next frame to execute the HPD processing.

(Step S109) When determining in step S105 that the presence of a person is not detected from the detection image on the odd lines, the HPD processing unit 120 switches the selected lines for a detection image in the next frame (for example, switches from the odd lines to the even lines). Then, the HPD processing unit 120 proceeds to a process in step S111.

(Step S111) In the next frame, the HPD processing unit 120 generates a detection image from an image captured by the pixel group of even lines to execute HPD processing using the generated detection image. Then, the HPD processing unit 120 proceeds to a process in step S113.

(Step S113) Based on the detection result by the HPD processing in step S111, the HPD processing unit 120 determines whether or not the presence of a person is detected from the detection image on the even lines (HPD=True). When determining that the presence of a person is detected from the detection image on the even lines (YES), the HPD processing unit 120 proceeds to a process in step S115. On the other hand, when determining that the presence of a person is not detected from the detection image on the even lines (NO), the HPD processing unit 120 proceeds to a process in step S117.

(Step S115) When determining in step S113 that the presence of a person is detected from the detection image on the even lines, the HPD processing unit 120 adopts the detection result to determine that a person (user) is present in front of the information processing apparatus 1 (HPD=True). Then, the HPD processing unit 120 proceeds to the process in step S119 to switch the selected lines for a detection image in the next frame (for example, to switch from the even lines to the odd lines), and returns to the process in step S103.

(Step S117) When determining in step S113 that the presence of a person is not detected from the detection image on the even lines, since the presence of a person is not detected from both of the detection images on the odd lines and the even lines, the HPD processing unit 120 determines that a person (user) is not present in front of the information processing apparatus 1 (HPD=False). Then, the HPD processing unit 120 proceeds to the process in step S119 to switch the selected lines for a detection image in the next frame (for example, to switch from the even lines to the odd lines), and returns to the process in step S103.

Thus, when the presence of a person is detected from at least either one of the detection image on the odd lines and the detection image on the even lines, the HPD processing unit 120 determines that a person (user) is present in front of the information processing apparatus 1. On the other hand, when the presence of a person is not detected from both of the detection image on the odd lines and the detection image on the even lines, the HPD processing unit 120 determines that no person (user) is present in front of the information processing apparatus 1.

Summary of First Embodiment

As described above, the information processing apparatus 1 according to the present embodiment includes: the camera 110 (an example of an imaging unit) which outputs data of a captured image captured using multiple pixels arranged on the image sensor 112; the system memory 155 (an example of a memory) which temporarily stores the data of the captured image output from the camera 110; and the image processing unit 156 (an example of a first processor) and the HPD processing unit 120 (an example of a second processor) which execute processing using the data of the captured image stored in the system memory 155. The image processing unit 156 controls the camera 110 to control the multiple pixels arranged on the image sensor 112 to capture images under imaging conditions different for each of preset plural kinds of pixel groups (for example, two kinds of pixel groups of the odd lines and the even lines) in order to execute image processing (an example of first processing) for creating an HDR image using data of the captured images each of which is captured from each of the plural kinds of pixel groups. The HPD processing unit 120 executes HPD processing (an example of second processing) to detect the presence of a person from a captured image using data of the captured image of one kind of pixel group (for example, either one of the odd lines and the even lines) among data of images each of which is captured from each of the plural kinds of pixel groups captured by the camera 110 under the control of the image processing unit 156.

Thus, since the information processing apparatus 1 performs HPD processing using data of a captured image of one kind of pixel group even when the camera 110 is capturing images under imaging conditions different for each of the plural kinds of pixel groups by the function of the system, the HPD processing using the captured image can be performed properly regardless of the usage state of the camera function while reducing the impact on the processing load and costs. In other words, the information processing apparatus 1 can perform the HPD processing using the captured image properly without being aware of whether or not the system is using the camera function or the HDR function and without impact on the processing load and costs to create an HDR image.

For example, when repeatedly executing the HPD processing, the HPD processing unit 120 switches the kind of pixel group for data of a captured image to be used in the HPD processing between data of captured images each of which is captured from each of two kinds of pixel groups of the odd lines and the even lines.

Thus, since the information processing apparatus 1 switches between captured images by the plural kinds of pixel groups captured under different imaging conditions to execute the HPD processing, the detection accuracy of the HPD processing in various scenes can be increased.

The image processing unit 156 controls the camera 110 to control the multiple pixels to capture images at exposure times different for each of the plural kinds of pixel groups (for example, for each of the two kinds of pixel groups of the odd lines and the even lines).

Thus, even when the camera 110 is capturing images at exposure times different for each of the plural kinds of pixel groups by the function of the system, since the information processing apparatus 1 switches between captured images by the plural kinds of pixel groups (for example, two kinds of pixel groups of the odd lines and the even lines) captured at different exposure times to execute the HPD processing, the detection accuracy of the HPD processing in various scenes can be increased.

As image processing, the image processing unit 156 synthesizes data of captured images each of which is captured from each of the plural kinds of pixel groups (for example, from each of the two kinds of pixel groups of the odd lines and the even lines) captured at different exposure times to create data of an HDR image with extended dynamic range.

Thus, even when the camera 110 is capturing images at exposure times different for each of the plural kinds of pixel groups by the function of the system to create an HDR image, the information processing apparatus 1 can perform the HPD processing properly using the captured images captured by the camera 110.

Further, a control method for the information processing apparatus 1 according to the present embodiment includes: a step of causing the image processing unit 156 (the example of the first processor) to control the camera 110 to control the multiple pixels arranged on the image sensor 112 to capture images under imaging conditions different for each of preset plural kinds of pixel groups (for example, for each of the two kinds of pixel groups of the odd lines and the even lines); a step of causing the image processing unit 156 to execute image processing (the example of the first processing) to create an HDR image using data of the captured images each of which is captured from each of the plural kinds of pixel groups; and a step of causing the HPD processing unit 120 (the example of the second processor) to execute HPD processing (the example of the second processing) to detect the presence of a person from a captured image using data of a captured image of one kind of pixel group (for example, either one of the odd lines and the even lines) among data of the captured images each of which is captured from each of plural kinds of pixel groups captured by the camera 110 under the control of the image processing unit 156.

Thus, since the information processing apparatus 1 performs HPD processing using data of a captured image of one kind of pixel group even when the camera 110 is capturing images under imaging conditions different for each of the plural kinds of pixel groups by the function of the system, the HPD processing using the captured image can be performed properly regardless of the usage state of the camera function while reducing the impact on the processing load and costs. In other words, the information processing apparatus 1 can perform the HPD processing using the captured image properly without being aware of whether or not the system is using the camera function or the HDR function and without impact on the processing load and costs to create an HDR image.

Second Embodiment

Next, a second embodiment of the present invention will be described.

In the first embodiment, the example of generating a detection image by alternately switching between the odd lines and the even lines for every frame to execute HPD processing using the generated detection image is described. However, when the presence of a person is detected (HPD=True) from the detection image, the detection image on the same lines may also be used to execute the HPD processing for the next frame.

This can suppress such a phenomenon that the presence of a person cannot be normally detected on one kind of lines (at one exposure time) (False negative). Further, when it is determined that the presence of a person is not detected (HPD=False) from the detection image, a detection image can be generated by alternately switching between the odd lines and the even lines again to execute HPD processing. Thus, the HPD processing can be executed using a detection image captured at a proper exposure time.

Figure 8:
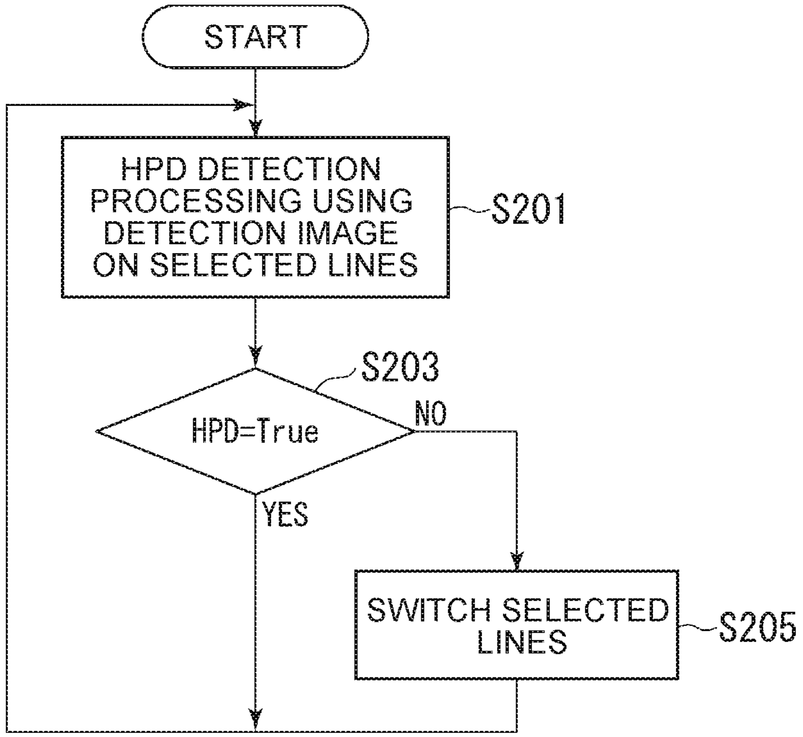
FIG. 8 is a flowchart illustrating HPD processing according to a second embodiment.

FIG. 8 is a flowchart illustrating an example of a line switching process in HPD processing according to the present embodiment.

(Step S201) The HPD processing unit 120 generates a detection image from an image captured by a pixel group of the selected lines (odd lines or even lines) to execute HPD processing using the generated detection image. Then, the HPD processing unit 120 proceeds to a process in step S203.

(Step S203) Based on the detection result by the HPD processing in step S201, the HPD processing unit 120 determines whether or not the presence of a person is detected (HPD=True) from the detection image on the selected lines. When determining that the presence of a person is detected from the detection image on the selected lines (YES), the HPD processing unit 120 returns to the process in step S201 to execute the HPD processing using the detection image on the same selected lines in the next frame as well. On the other hand, when determining that the presence of a person is not detected from the detection image on the selected lines (NO), the HPD processing unit 120 proceeds to a process in step S205.

(Step S205) The HPD processing unit 120 switches the selected lines and returns to the process in step S201 to execute the HPD processing using a detection image on different selected lines in the next frame.

Thus, in the information processing apparatus 1 according to the present embodiment, when the presence of a person is detected in the HPD processing, the HPD processing unit 120 uses data of a captured image of the same kind of pixel group as data of a captured image from which the presence of a person is detected next time when executing the HPD processing (for example, in the next frame). For example, when the presence of a person is detected in the HPD processing using the detection image on the odd lines, the HPD processing unit 120 uses the detection image on the odd lines next time when executing the HPD processing (for example, in the next frame). Further, when the presence of a person is detected in the HPD processing using a detection image on the even lines, the HPD processing unit 120 uses the detection image on the even lines next time when executing the HPD processing (for example, in the next frame).

Thus, the information processing apparatus 1 can suppress the occurrence of such a phenomenon that the presence of a person cannot be normally detected under imaging conditions of either the odd lines or the even lines (for example, at either one of exposure times) (False negative). Further, when the presence of a person is not detected in the HPD processing, the HPD processing unit 120 switches to data of a captured image of a pixel group different in kind from data of a captured image of a pixel group by which the presence of a person is not detected next time when executing the HPD processing (for example, in the next frame). For example, when the presence of a person is not detected in the HPD processing using the detection image on the odd lines, the HPD processing unit 120 switches to HPD processing using a detection image on the even lines next time when executing the HPD processing (for example, in the next frame). Further, when the presence of a person is not detected in HPD processing using a detection image on the even lines, the HPD processing unit 120 switches to HPD processing using a detection image on the odd lines next time when executing the HPD processing (for example, in the next frame).

Thus, the information processing apparatus 1 can execute the HPD processing using the detection image captured under the proper imaging conditions (for example, at the proper exposure time).

While the embodiments of this invention have been described in detail above with reference to the accompanying drawings, the specific configurations are not limited to the above-described embodiments, and design changes are included without departing from the scope of this invention. For example, the respective configurations in the respective embodiments described above can be combined arbitrarily.

Further, in the aforementioned embodiments, as the plural kinds of pixel groups to be controlled to different imaging conditions (for example, different exposure times), the description is made by taking, as an example, two kinds of pixel groups of the odd lines and the even lines, but the plural kinds of pixel groups may also be pixel groups of three or more kinds.

Further, in the aforementioned embodiments, the example in which the plural kinds of pixel groups are controlled to imaging conditions (for example, exposure times) different line by line between the odd lines and the even lines is described, but the pixel groups to be controlled to different imaging conditions (for example, different exposure times) are not limited to line-by-line pixel groups. The pixel groups may also be pixel groups constructed on a block-by-block basis such as a block of 2×2 pixels, 3×3 pixels, 4×4 pixels, or the like, or pixel groups constructed in units of pixels that are not adjacent to each other.

Further, in the aforementioned embodiments, the example in which the exposure time is taken as the imaging condition when the plural kinds of pixel groups are controlled to different imaging conditions is described, but the imaging condition is not limited to the exposure time, and the sensitivity may also be made different.

Further, in the aforementioned embodiments, the example in which the HPD processing is executed one frame by one frame is described, but the HPD processing may also be executed every plural frames (every two frames, every three frames, or the like). When the HPD processing is executed every plural frames, the plural kinds of pixel groups (for example, the two kinds of pixel groups of the odd lines and the even lines) are switched in units of frames in each of which the HPD processing is executed.

Further, in the aforementioned embodiments, the configuration of executing HPD processing using data of a captured image of one kind of pixel group (for example, either one of the odd lines or the even lines) among data of captured images each of which is captured from each of the plural kinds of pixel groups captured by the camera 110 regardless of the usage state of the camera function by the system is described. However, the information processing apparatus 1 may also execute the HPD processing using data of a captured image of one kind of pixel group (for example, either one of the odd lines and the even lines) only when creating an HDR image (HDR shooting). During normal shooting without creating any HDR image (HDR shooting), since the information processing apparatus 1 controls the multiple pixels arranged on the image sensor 112 to the same imaging conditions (for example, the same exposure time), the HPD processing may also be executed by using, as a detection image, at least part of a captured image captured on the image sensor 112 without splitting the multiple pixels into plural kinds of pixel groups. However, when the HPD processing is performed in the same way regardless of the usage state of the camera function by the system, since there is no need to change the processing by detecting the usage state of the camera function, the impact on the processing load and costs can be more suppressed.

Further, processing for detecting the presence of an object other than a person may be performed instead of the HPD processing (the example of the second processing). For example, the second processing executed by using data of a captured image of one kind of pixel group (for example, either one of the odd lines or the even lines) among data of captured images each of which is captured from each of the plural kinds of pixel groups captured by the camera 110 under the control of the image processing unit 156 may be processing for detecting part of a person (a face, eyes, a hand, a leg, or the like), or may be processing for detecting an animal or an object other than the person. Further, this second processing may be processing for detecting the quality, any result, or the like of goods or a product from a captured image captured by the camera 110. In other words, this second processing can be any processing for detecting any information from a captured image captured by the camera 110.

Further, in the aforementioned embodiments, the example in which the camera 110 includes, as the image sensor 112, an RGB sensor (visible light sensor) to capture an RGB image is described, but the present invention is not limited to this example. For example, the camera 110 may further include, as the image sensor 112, an IR sensor to capture an IR (InfraRed) image. For example, the camera 110 may include the RGB sensor and the IR sensor separately as the image sensor 112, or may include a hybrid sensor with the RGB sensor and the IR sensor integrated therein.

Further, respective components included in the system processing unit 150 may be integrated on one chip as an SoC (System-on-a-Chip) or configured as plural chips. For example, the image processing unit 156 may be integrated, as one chip, with any other component included in the system processing unit 150, or may be configured as another chip (processor). Further, the HPD processing unit 120 and the image processing unit 156 may be integrated as one chip (one processor).

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the above-described embodiment may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 in the aforementioned embodiments is not limited to the PC, which may also be a tablet terminal, a smartphone, a game machine, a multi-media terminal, or the like.

DESCRIPTION OF SYMBOLS

1 information processing apparatus
110 camera
120 HPD processing unit
130 keyboard
140 display unit
150 system processing unit
151 CPU
152 GPU

153 memory controller
154 I/O controller
155 system memory
156 image processing unit
160 storage unit
170 EC
180 power supply circuit
190 battery

What is claimed is:

1. An information processing apparatus comprising:

an imaging unit which outputs data of a captured image captured using multiple pixels arranged on an image sensor;

a memory which temporarily stores the data of the captured image output from the imaging unit; and a first processor and a second processor which execute processing using the data of the captured image stored in the memory, wherein the first processor controls the imaging unit to control a first pixel group to capture a first image at a first exposure time and a second pixel group different from the first pixel group to capture a second image at a second exposure time in order to execute first processing using data of to synthesize the captured first and second images into data of an image with extended dynamic range, and the second processor executes second processing using either the captured first image or the captured second image to detect a presence of a person.

2. The information processing apparatus according to claim 1, wherein when repeatedly executing the second processing, the second processor switches the pixel group of the data of the captured image used in the second processing among the data of the captured images each of which is captured from each of the pixel groups.

3. The information processing apparatus according to claim 2, wherein when detecting the presence of a person in the second processing, the second processor uses data of a captured image of similar pixel group as the data of the captured image from which the presence of the person is detected next time when executing the second processing.

4. The information processing apparatus according to claim 3, wherein when not detecting the presence of a person in the second processing, the second processor switches to data of a captured image of a pixel group different from the data of the captured image of the pixel group from which the presence of a person is not detected next time when executing the second processing.

5. The information processing apparatus according to claim 1, wherein the multiple pixels are arranged in a matrix on the image sensor, and the pixel groups are in units of one or more rows among the multiple pixels arranged on the image sensor.

6. A control method for an information processing apparatus including: an imaging unit which outputs data of a captured image captured using multiple pixels arranged on an image sensor; a memory which temporarily stores the data of the captured image output from the imaging unit; and a first processor and a second processor which execute processing using the data of the captured image stored in the memory, the control method comprising:

causing the first processor to control the imaging unit to control a first pixel group to capture a first image at a first exposure time and a second pixel group different from the first pixel group to capture a second image at a second exposure time;

causing the first processor to execute first processing to synthesize the captured first and second images into data of an image with extended dynamic range; and causing the second processor to execute second processing using either the captured first image or the captured second image to detect a presence of a person.

* * * * *